June 19, 1934.   G. M. DAVIS   1,963,294
COOKING UTENSIL
Filed Aug. 9, 1932
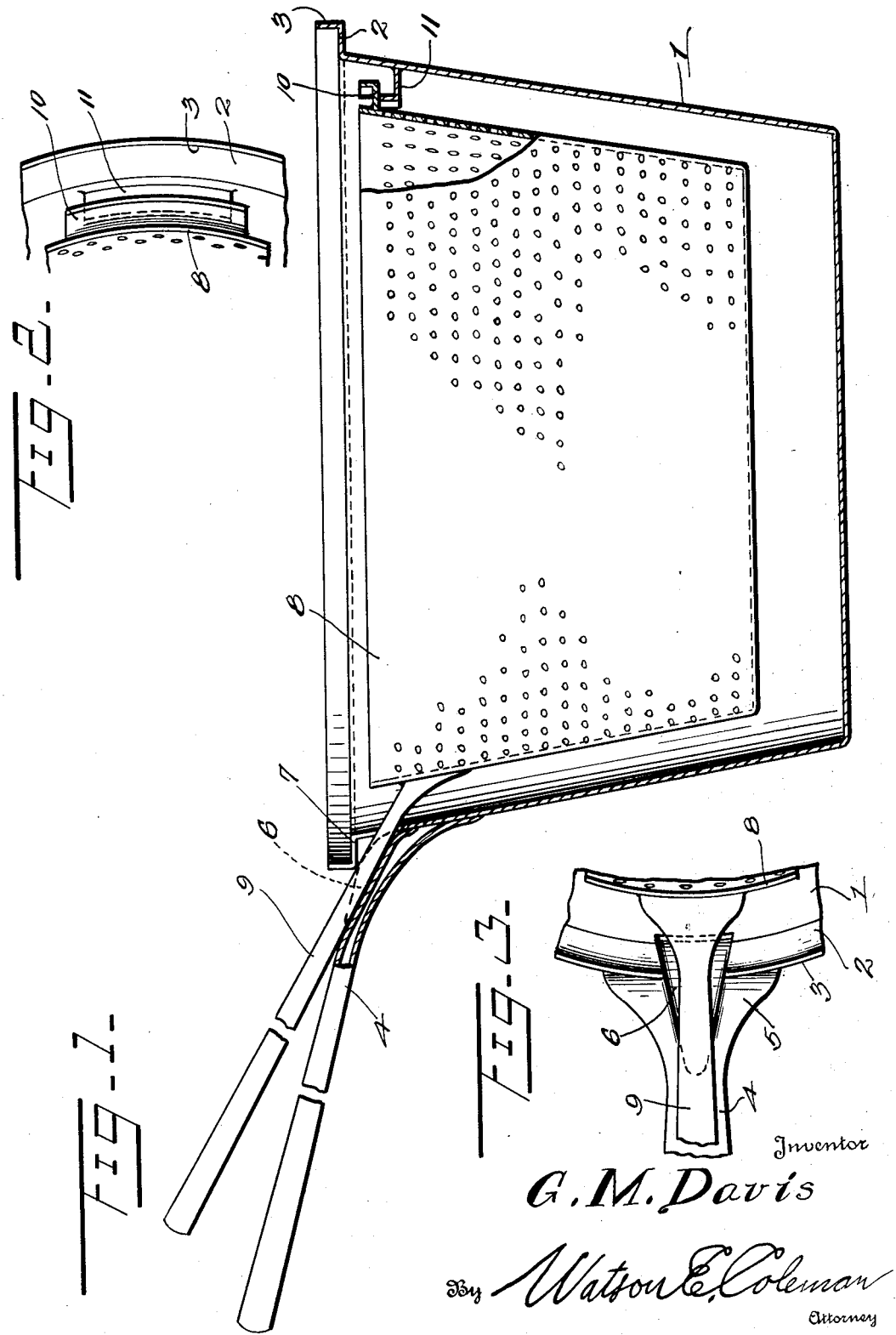
Inventor
G. M. Davis
By Watson E. Coleman
Attorney Patented June 19, 1934

1,963,294

UNITED STATES PATENT OFFICE 1,963,294

COOKING UTENSIL

Georgia M. Davis, Plant City, Fla.

Application August 9, 1932, Serial No. 628,084

2 Claims. (Cl. 53—1)

This invention relates to the class of cooking utensils and pertains particularly to an improved combination of saucepan or pot and colander or inner perforated receptacle.

The primary object of the present invention is to provide a combined pot and inner perforated receptacle in which the inner receptacle is provided with a handle and the two receptacles are so designed that the inner one may be suspended in the outer one and a lid or other cover placed on the outer receptacle to closely cover the two.

Another object of the invention is to provide an outer cooking receptacle or pot having a flange or bracket on the inner wall diametrically opposite the point of attachment of the handle therewith and having the top surface of the handle grooved or recessed so as to receive the handle of a perforated receptacle designed to be placed in the outer receptacle, the perforated receptacle having a supporting lug which engages the bracket on the outer receptacle wall.

The invention will be best understood from a consideration of the following detailed description taken in connection with the accompanying drawing forming part of this specification, with the understanding, however, that the invention is not confined to any strict conformity with the showing of the drawing but may be changed or modified so long as such changes or modifications mark no material departure from the salient features of the invention as expressed in the appended claims.

In the drawing:—

Figure 1 is a view in vertical section of the cooking utensil embodying the present invention;

Figure 2 is a fragmentary view looking down upon the connecting means between the inner and outer receptacle at the front thereof;

Figure 3 is a fragmentary view looking down upon the inner and outer receptacles toward the handles thereof.

Referring now more particularly to the drawing wherein like numerals of reference indicate corresponding parts throughout the several views, the numeral 1 indicates the outer receptacle or pot of the present utensil which is formed about its top edge to provide the off-set flange 2 enclosed by the vertical rim portion 3, thus providing a means for receiving and holding the edge of a cover or lid (not shown) to retain the same firmly in position.

The receptacle 1 is provided with the usual straight handle 4 which at its inner end is relatively broad, as indicated at 5, and is secured in any suitable manner to the outer surface of the receptacle wall, as shown in Figure 1.

This broad portion 5 of the handle 4 is formed in its top surface to provide the longitudinally extending groove or channel 6 and the adjacent portion of the wall of the receptacle 1 is cutout as indicated at 7 to provide an entrance to the channel 6.

Associated with the outer receptacle 2 is an inner perforated receptacle or colander 8, to the wall of which is secured the straight or rigid handle 9 which extends at an upward inclination therefrom. This perforated inner receptacle 8 is of materially less overall diameter than the receptacle 1 so that it may be readily placed within the outer receptacle in the manner shown. When so placed in the outer receptacle the handle 9 positions in the channel 6 of the outer receptacle handle 4 and the opposite side of the inner receptacle is retained in position by the coating lug 10 and bracket 11. As shown, the bracket 11 comprises a plate of any suitable character which is secured to and extends inwardly from the inner surface of the outer receptacle wall adjacent the top thereof and the lug 10 comprises a similar short plate which is secured to the outer surface of the perforated wall of the inner receptacle 8.

The lug and bracket 10 and 11 have been illustrated as in the form of relatively thin plates having their outer edges turned upwardly, one to provide a flange upon which the other rests, the flange being an integral part of the bracket 11, however, it is to be understood that the invention is not to be limited to the specific type of lug and bracket shown, as these bodies may, if desired, be in the form of solid relatively thick members, or they may be in the form one of a hook and the other of a staple.

In the form shown and illustrated in top plan in Figure 2 it will be seen that the tilting laterally of the inner receptacle 8 is prevented due to the substantial length of the lug and bracket and for this reason this form of the invention is preferred.

It will also be readily apparent from the foregoing that as the top edge of the perforated receptacle is a substantial distance below the flange portion 2 of the outer receptacle and the handle 9 also lies in a plane below the flange 2 of the outer receptacle where it engages in the recess 6, a lid or cover of the proper diameter may be readily placed in the channel formed about the top edge of the outer receptacle 1 by the flange 2 and rim 3 and thus relatively tightly close the receptacle, the only place remaining open being the small area above the handle 9 where the opening 7 is cut for the insertion of the handle. This opening may readily provide a steam escape and thus operate to prevent steam developed in the pan from causing the lid to rise or jump up and down upon the receptacle as is common in cooking utensils where the lid fits tightly.

Having thus described the invention, what is claimed is:—

1. A cooking utensil of the character described comprising a pair of receptacles one being removably placed within the other, the inner receptacle being perforated, a handle secured to the wall of the outer receptacle and having a longitudinal channel in the top surface adjacent the supporting wall therefor, the said outer receptacle having an opening in the top edge thereof toward which said channel is directed, a handle carried by the inner receptacle and adapted to lie in said channel, and a pair of coacting members carried by the walls of the inner and outer receptacle for supporting the inner receptacle in a desired position, said channel and said opening being of a depth to permit the adjacent portion of the inner receptacle handle to position below the plane of the edge of the outer receptacle whereby a flat lid may be placed on the said edge of the outer receptacle.

2. A cooking utensil, comprising a pair of receptacles, one being removably disposed in the other, an outwardly projecting surrounding flange formed integral with the top edge of the outer receptacle and terminating in an upwardly directed rim, said outer receptacle having a recess formed downwardly from the top edge in the wall thereof through and extending beneath said rim and flange, a handle secured to the outer receptacle immediately beneath said recess, said handle having a longitudinally extending channel in the top thereof, the bottom of which channel coincides with the bottom edge of said recess, a handle upon the inner receptacle adapted to lie in said recess and upon the bottom of the channel of the outer receptacle handle whereby to support one side of the inner receptacle, and means diametrically opposite the handles of the receptacles coacting to support the side of the inner receptacle opposite its handle, said recess being of a depth to permit the inner receptacle handle to lie in a plane beneath said flange whereby a cover disposed on the flange will contact with the same throughout its entire extent.

GEORGIA M. DAVIS.